(12) United States Patent
Dobler et al.

(10) Patent No.: US 6,369,565 B1
(45) Date of Patent: Apr. 9, 2002

(54) METHOD FOR DETERMINING THE THICKNESS OF A LAYER OF ELECTRICALLY CONDUCTIVE MATERIAL

(75) Inventors: Klaus Dobler, Gerlingen; Hansjoerg Hachtel, Weissach; Reinhard Dimke, Stuttgart; Franz Auf Der Heide, Litzendorf; Richard Blattert, Murr; Josef Weber, Oberriexingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/462,591

(22) PCT Filed: Mar. 24, 1999

(86) PCT No.: PCT/DE99/00869

§ 371 Date: Apr. 28, 2000

§ 102(e) Date: Apr. 28, 2000

(87) PCT Pub. No.: WO99/58923

PCT Pub. Date: Nov. 18, 1999

(30) Foreign Application Priority Data

May 8, 1998 (DE) .......................................... 198 20 546

(51) Int. Cl.⁷ ............................ G01N 27/72; G01B 7/06
(52) U.S. Cl. ........................ 324/225; 324/230; 324/202

(58) Field of Search .......................... 324/225, 228–243, 324/202

(56) References Cited

U.S. PATENT DOCUMENTS 3,922,599 A * 11/1975 Steingroever et al. ....... 324/230
4,829,251 A *  5/1989 Fischer ......................... 324/230
5,525,903 A *  6/1996 Mandl et al. ................. 324/230

FOREIGN PATENT DOCUMENTS

DE       19652750 A  *  7/1998
GB        2257520 A  *  1/1993

* cited by examiner

*Primary Examiner*—Jay Patidar
(74) *Attorney, Agent, or Firm*—Michael J. Striker

(57) ABSTRACT

In a method for determining a thickness of a layer of electromagnetically conductive material, the measurement errors resulting from different quality of the basic material are eliminated. For each basic material, one dimensionless characteristic value (K) is ascertained. With the aid of a characteristic calibration curve, each characteristic value (K) can be assigned a correction factor (F), with which the measured value of the layer thickness ($D_M$) can be converted into a real value of the layer thickness (D). Different electrical and magnetic properties, dictated by the different quality of the basic material, can thus be largely eliminated.

2 Claims, 6 Drawing Sheets

—— •••• oooo ××××

$\alpha_1 < \alpha_2 < \alpha_3 < \alpha_4$
$\beta_1 < \beta_2 < \beta_3 < \beta_4$

METHOD FOR DETERMINING THE THICKNESS OF A LAYER OF ELECTRICALLY CONDUCTIVE MATERIAL

BACKGROUND OF THE INVENTION

The invention is based on a method for determining a thickness of a layer of electromagnetically conductive material, in particular a chromium layer, as described for example in German Patent Disclosure DE-A 196 52 750.3, published after the filing date of the present application. A prerequisite of that measuring method is that the quality of the basic material onto which the layer is applied is relatively constant over production and fluctuates only within narrow limits. In mass production, however, these narrow fluctuation limits can be adhered to only with difficulty. Hence measurement inaccuracies in determining the layer thickness can come about.

SUMMARY OF THE INVENTION

The method of the invention for determining a thickness of a layer of electromagnetically conductive material, having the characteristics of the independent claim, has the advantage over the prior art that layer thickness determination is possible when the quality of the basic material fluctuates relatively widely. The resultant measurement errors can be largely eliminated by means of a premeasurement. Particularly in mass production, the base bodies produced by different vendors have different qualities in terms of material properties and thus have different electrical and magnetic properties. These fluctuations in the material nature of the basic material can be eliminated relatively simply.

By means of the provisions recited in the dependent claims, advantageous refinements of and improvements to the method defined by the independent claim are possible.

BRIEF DESCRIPTION OF THE DRAWINGS

One exemplary embodiment of the invention is shown in the drawing and described in further detail in the ensuing description.

FIG. 4 shows the course of the standardized values Me over the layer thickness a.

FIG. 6 shows the course of the standardized values Me over the layer thickness a.

DESCRIPTION OF THE PREFERRED EMBODIMENTS

First, the measuring method described in DE-A 196 52 750.3, which is improved by the correction method of the invention, will be described. The measuring method itself is based on what is known as the inductive eddy current measuring method.

Figure 1:
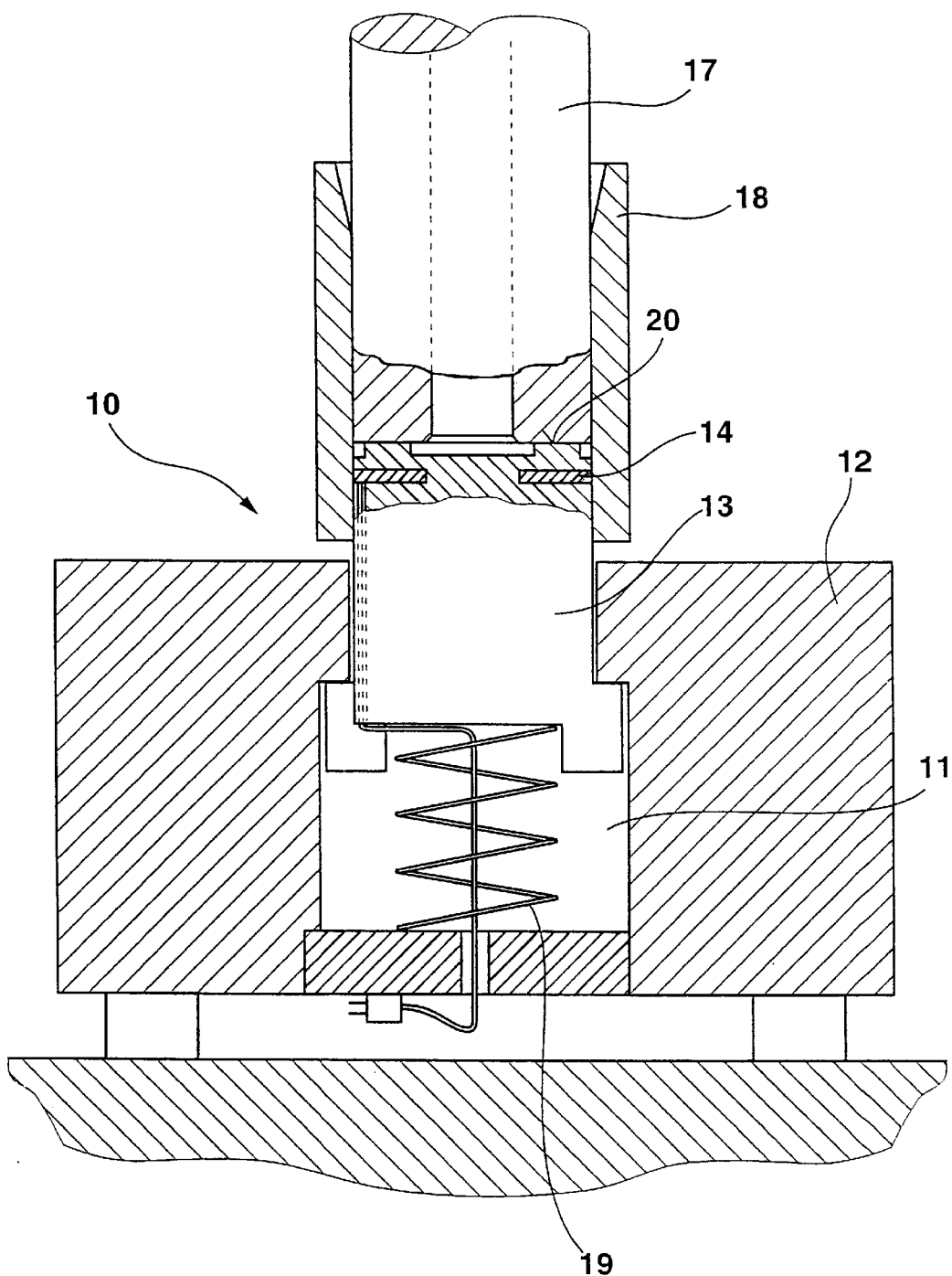
FIG. 1 shows a schematic layout of the measuring apparatus.

In FIG. 1, a sensor 10 used for this method is shown in terms of its construction. The sensor 10 is disposed in the recess 11 of a basic body 12 and comprises a coil body 13, on which a coil 14 is mounted through which a high-frequency alternating current, such as 4 MHz, flows. The coil 14 can for example be embodied as a flat coil or a ring coil. The coil body 14 preferably comprises electrically nonconductive and nonferromagnetic material, such as plastic, and is guided virtually without friction in the recess 11. The component 17 to be monitored is placed in a guide body 18, which positions the component 17 and the coil 14 relative to one another. With the aid of a spring 19, the coil body 13 and thus the coil 14 are pressed against the surface 20 of the component 17. The surface 20 has the layer to be determined. The component 17 may for example be the stub of an injection valve, in which case the layer 20 is a chromium layer. If an alternating current flows through the coil 14, then an alternating magnetic field is generated, which penetrates both the chromium layer 20 and the layer beneath it that comprises ferromagnetic material of the component 17. In the chromium layer 20, then only the eddy current effect is operative, while in the ferromagnetic material of the base body 17, both the inductive and the-eddy current effect are operative. The various measuring effects that would occur if the respectively other part were not present will now be explained individually. If an alternating current flows through the coil 14, and if the alternating magnetic field of the coil engages only an electrically highly conductive but not ferromagnetic material—that is, if only the chromium layer 20 were engaged by the alternating magnetic field—then only the so-called eddy current effect is operative. Because of the eddy currents that develop in the electrically highly conductive but not ferromagnetic material, the result is a reduction in the inductance of the coil 14.

Figure 2:
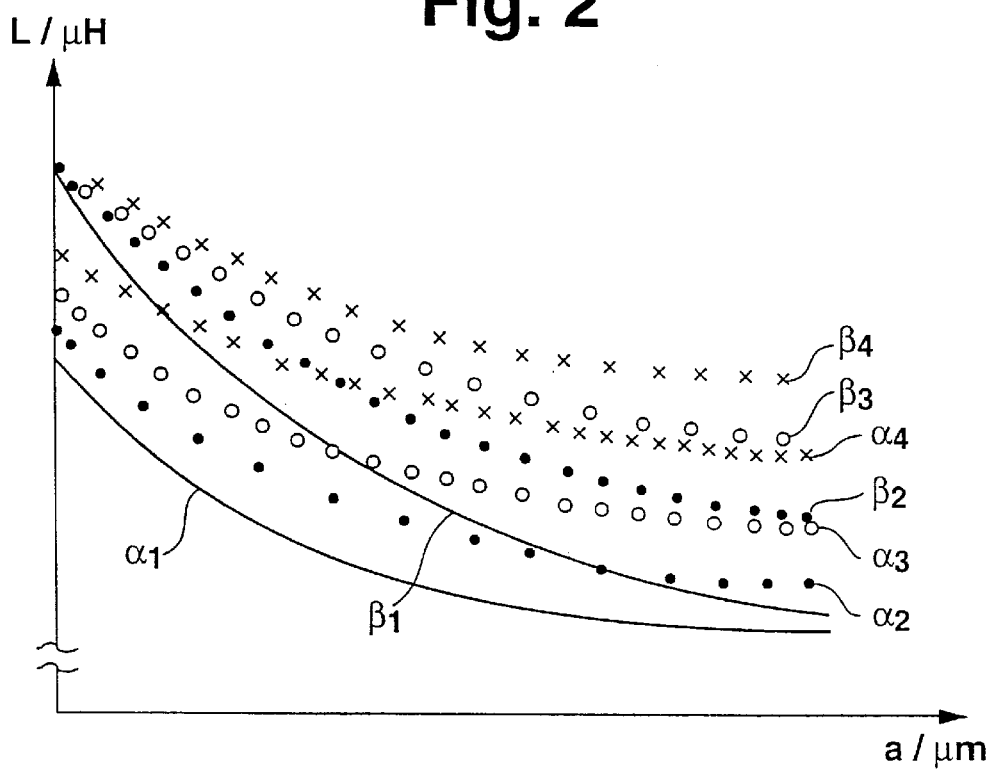
FIG. 2 shows the course of the inductance L of the measuring coil over the thickness a of the layer to be determined, for different spacings and different material natures and, respectively, of the material located under the layer to be determined.

The action of the magnetic field of the coil 14, through which an alternating coil flows, on the ferromagnetic material opposite it, that is, the material of the base body 17, will now be described. The alternating magnetic field of the coil through which alternating current flows engages the material of the base body 17. It should be pointed out that in material that is both electrically conductive and ferromagnetic, both the ferromagnetic effect and the eddy current effect are operative. While the eddy current effect causes a reduction in the inductance of the measuring coil, the ferromagnetic effect causes an increase in the inductance of the measuring coil. Which of the two effects predominates depends primarily on the frequency of the alternating current that flows through the coil 14 and on the material nature of the base body 17. If these two measuring effects are employed on the base body 17 with the chromium layer 20, it can be found that the thicker the chromium layer 20, the weaker is the magnetic field that develops, and thus the inductance of the coil 14 is weaker. In FIG. 2, 1 is a corresponding measurement curve, which shows the decreasing course of the inductance of the measuring coil 14 over the increasing thickness of the chromium layer 20.

Figure 3:
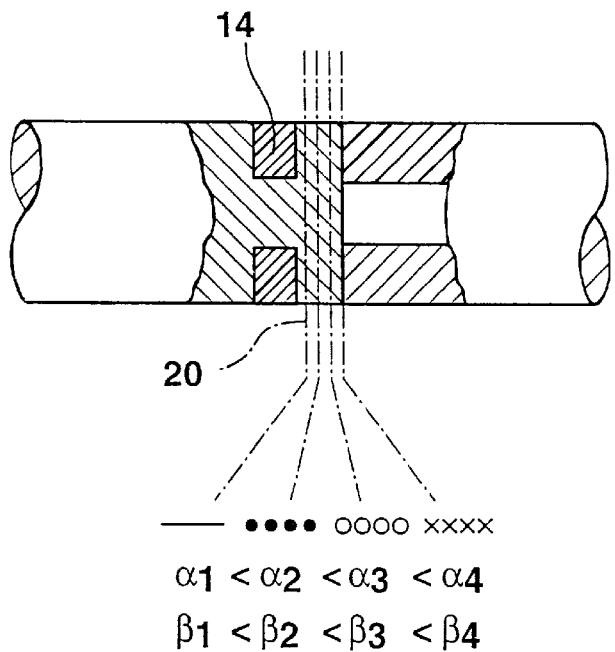
FIG. 3 shows the ratio of the different spacings, used in FIG. 2, Between the measuring coil and the object of measurement.

The course of the measurement curve of the inductance L over the layer thickness a, however, depends on the material nature of the base body 17, that is, for example on the electrical resistance, the permeability of the material, and the spacing between the coil 14 of the surface 20 to be measured. For example, if because of soiling or wear of the coil body the spacing between the measuring coil 14 and the chromium layer 20 changes, then the result is different characteristic curves of the course of the inductance L over the layer thickness a. Various examples for this are shown in FIG. 2. The characteristic curves 2, 3 and 4 here illustrate the course of the inductance L over the layer thickness a with a varying spacing between the measuring coil and the chromium layer to be monitored, but with the same material nature of the base body 17. In FIG. 3, the magnitude of the spacing alpha between the coil 14 and the chromium layer 20 to be monitored is shown. It can be seen that the spacing becomes greater and greater from 1 to 4. If conversely the material nature of the base body 17 were modified, then the result would be the characteristic curves 1 through 4. The characteristic curves 1 through 4 in turn mean a variation in the spacing between the measuring coil and the chromium layer to be monitored for a second material nature of the base body. From the graph in FIG. 2, it can be seen that a plurality of possible layer thicknesses can be associated with a single measured inductance value L. Instead of the inductance, the alternating current resistance value of the coil can also be evaluated.

The measuring method of the invention now also makes an unambiguous association possible between the measured inductance values L of the measuring coil 14 and the thickness a of the chromium layer 20 if the material nature of the base body 17 and/or the spacing between the measuring coil 14 and the surface of the chromium layer to be determined changes. The nucleus of the method of the invention is to perform a standardization, which eliminates incident measurement errors and ascertains an unambiguous assignable measured value.

The method of the invention for determining the thickness of a layer is performed in a plurality of measurement and evaluation steps. Before the base body 17 is coated, an inductance value $L_0$ is ascertained in a so-called premeasurement. Here the coil 14 is seated as directly as possible on the still uncoated surface (measuring surface) of the base body 17 oriented toward the coil. Thus a measurement only opposite the material of the base body 17 is performed. The magnitude of the inductance value $L_0$ depends on the nature of the base body, and in particular on its magnetic and electrical properties. This nature of the base body 17 can fluctuate over the course of mass production. The inductance value $L_0$ must therefore be ascertained at the beginning of measurement for each individual base body 17 and must also be stored in memory in an assignable way in a data memory.

Next, the base body 17 is provided with a chromium layer 20 in a suitable coating system. After that, a second measurement, a so-called postmeasurement is made at the same point of the base body 17 as the aforementioned premeasurement. This yields an inductance value $L_X$ of the measuring coil 14. The magnitude of the inductance value $L_X$ is determined, among other factors, by the thickness of the chromium layer 20 and by the material nature of the base body 17. Assurance must be provided that both inductance values $L_0$ and $L_X$ ascertained can each be associated unequivocally with the same base body 17. These two inductance values $L_0$ and $L_X$ are now converted with the aid of an algorithm into standardized values, that is, dimensionless characteristic numbers that can be associated with a corresponding-layer thickness. To enable forming these standardized values, the inductance value L must be ascertained. This inductance value L is obtained if, using a calibration body, a measurement is performed solely opposite a chromium layer. The surface of the calibration body must have a chromium layer thick enough that it shields off the entire magnetic field of the coil, so that neither the inductive nor the eddy current effect can have an effect in the ferromagnetic basic material of the calibration body. Optionally, instead of chromium, some other electrically conductive but nonferromagnetic material can be used as a substitute for the calibration body. The standardized value Me is now ascertained, using equation 1. The factor 1000 can be varied arbitrarily between zero and infinity.

$$Me = 1000 \cdot \frac{L_x - L_0}{L_\infty - L_0} \quad (1)$$

in which
Me=measurement value/standardized value
$L_0$=inductance value (uncoated base body)
$L_X$=inductance value (coated part)
L=inductance value (calibration body made of chromium)

Figure 4:
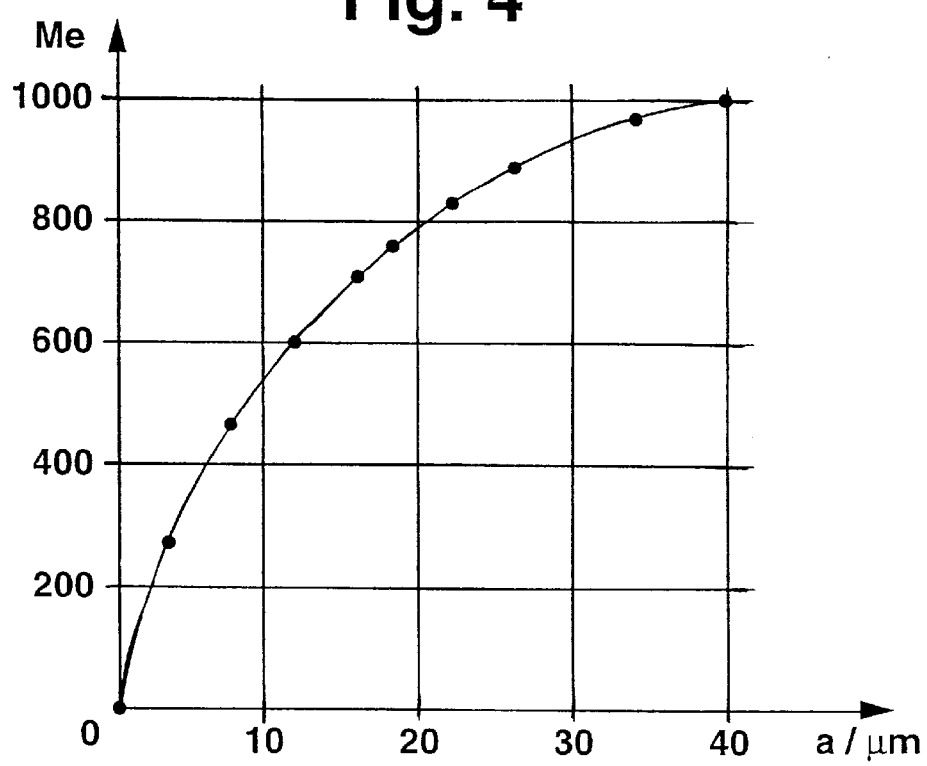

In FIG. 4, the course of the measured values Me, standardized in accordance with equation (1), is plotted over the layer thickness a. The various curves shown in FIG. 2 produce a virtually coincident course of the various ascertained standardized values Me. It can be seen that in FIG. 4, compared with FIG. 2, an unequivocal association of a standardized value Me with a thickness of the layer 20 is possible.

Thus far, with the aid of equation 1, the errors that are due to the different spacings between the measuring coil and the layer to be determined and to different magnetic or electrical properties of the material of the base body 17 have been virtually eliminated. However, it is still possible also to suppress the influence on the outcome of measurement of what is known as offset drift, which is due among other factors to temperature fluctuations. For this purpose, the inductance value of the measuring coil which results when the measuring coil is measured solely in air, or in other words when neither a chromium layer nor any other mechanical component is opposite it, should be detected as well. This measured value will hereinafter be called the standard air value $L_l$. It is ascertained shortly before or after (as nearly as possible at the same time) the inductance value L, with the aid of a calibration body. This value Ll represents a base value that is used in each case for the subsequent measurements. During the individual measurement of the individual base body 17, an inductance value $Ll_0$, which results when the measuring coil is again measured in air, is ascertained shortly before or after the aforementioned so-called premeasurement, or in other words as nearly as possible as the ascertainment of the inductance value $L_0$ of the coil. Next, for example in a microcomputer, a difference is found $L_0=Ll_0-Ll$. With the aid of this value $L_0$, corrected inductance values $L_0*=L_0-L_0$ are now calculated. Logically, the corrected measurement value $L_X*$ should be ascertained as well in the measurement of the inductance value $L_X$. Shortly before or after the aforementioned postmeasurement, that is, shortly before or after the ascertainment of the value $L_X$, the inductance value of the coil in air is detected, represented by the symbol $Ll_X$. The value of the coil in air should be ascertained once again here, because there can be a time difference and thus a temperature fluctuation between when the inductance value of the coil is ascertained in air in-the so-called premeasurement and when the so-called postmeasurement is made. The so-called standard air value L1 once ascertained can be used both in the correction of the inductance value $L_0$ and of the inductance value $L_X$ over a relatively long period of time. It is also sufficient if the inductance value L, which represents the inductance value of a measurement solely opposite a chromium layer, is picked up only at intervals and stored in memory for a relatively long time in a database. However, if the inductance value L is picked up anew, for instance in order to take into account a slow, continuous change in the spacing between the measuring coil and the object to be measured (such as abrasion), then the so-called standard air value L1 must be renewed at the same time as well. Now to allow the offset drift in the measurement result that is caused by temperature fluctuations to be taken into account in forming the standardized value, equation 2 should be used.

$$Me = 1000 \cdot \frac{(Lx - (Ll_x - Ll_\infty)) - (L_0 - (Ll_0 - Ll_\infty))}{L_\infty - (L_0 - (Ll_0 - Ll_\infty))} \quad (2)$$

If a sensor is replaced, then the inductance values L and L1 have to be picked up over again. If the replacement happens between the premeasurement and the postmeasurement, then the old reference value L1 must also be used in the postmeasurement.

Figure 8:
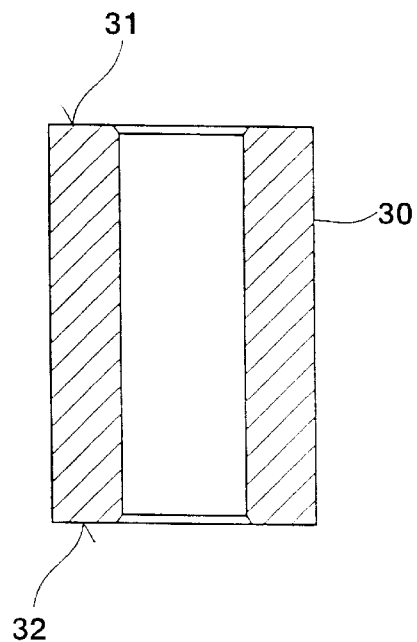
FIG. 8 shows a modification of the calibration body used in the measuring method.

In some materials for the base body 17, the electrical and magnetic values of the material of the base body vary over relatively long periods of time. This variation, known as drift, can be of varying magnitude for each measurement body to be determined, since this drift depends not only on the material nature but also on the individual heat treatment that occurs before the chromium plating is done. For picking up characteristic calibration curves—see FIG. 4—calibration bodies of the kind shown in FIG. 8 are therefore produced. The calibration body 30 has two end faces 31 and 32. The measuring face 31 here comprises the uncoated basic material, while the measuring face 32 is provided with the chromium layer. However, both measuring faces 31 and 32 are identical in shape. The thickness of the chromium layer that is applied to the measuring face 32 is known. The standardized value ascertained in the calibration using this calibration body 30 varies not at all or only insignificantly, even if the electrical and magnetic properties of the basic material change as a result of aging. The prerequisite here is a homogenous change in the magnetic and electrical properties of the basic material over the entire calibration body.

Figure 5:
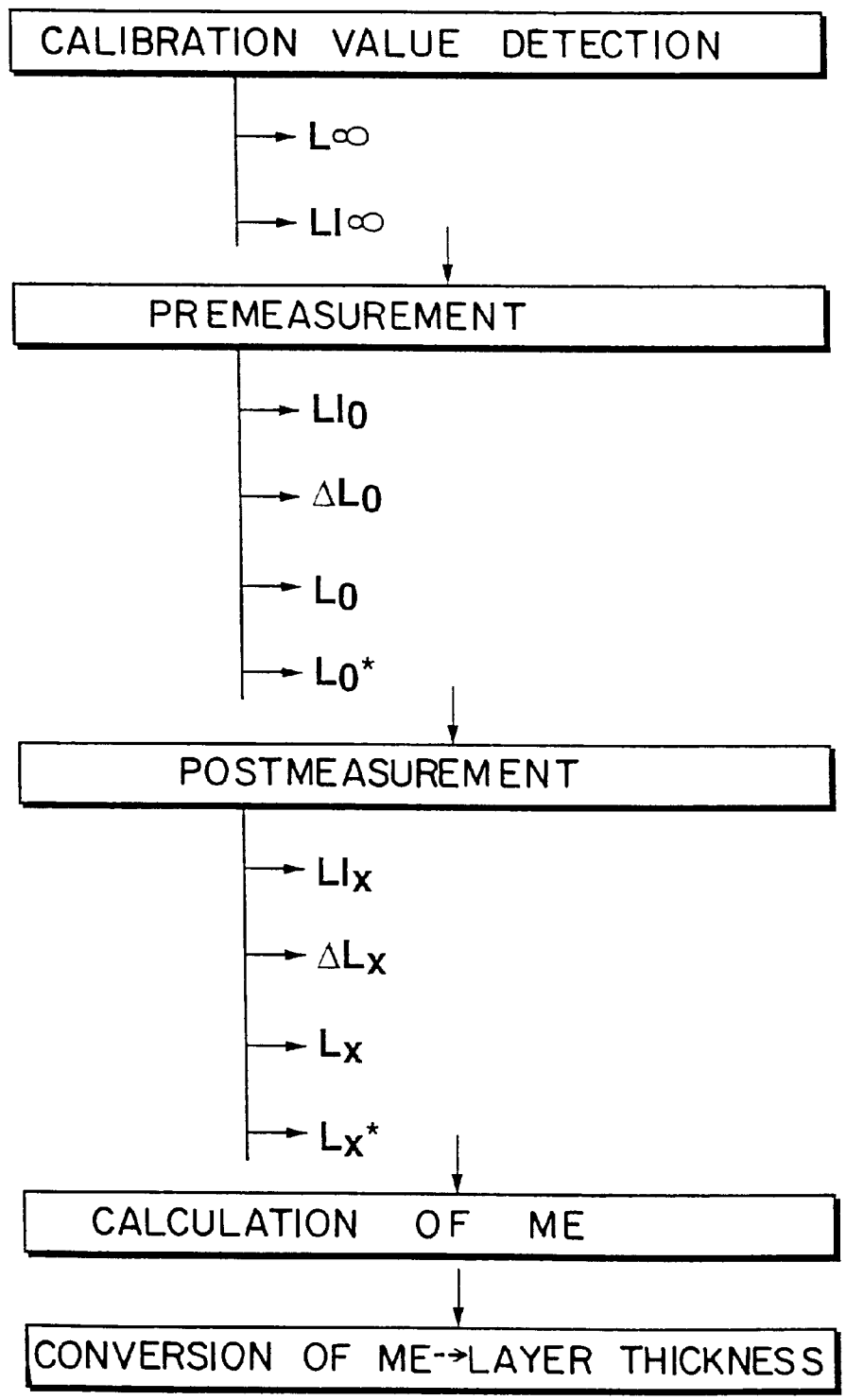
FIG. 5 is a block circuit diagram for the method.

The individual steps in measurement and calculation will now be listed once again with reference to the chart in FIG. 5. The measuring method proceeds as explained roughly in three steps, that is, a so-called calibration value detection, so-called premeasurement, and so-called postmeasurement. In the calibration value detection, the inductance value L ascertained that is determined solely opposite the material (or its substitute material) whose thickness is ascertained; the thickness of the calibration body is preferably greater than the penetration depth of the alternating magnetic field of the measuring coil.

Next, the inductance value L1 is ascertained, which represents the inductance value of the measuring coil in air as close as possible to the time of detection of the value L The so-called premeasurement portion now begins.

3. Detection of the current inductance value of the coil in air $Ll_0$.

4. Forming the difference $L_0 = Ll_0 - L$.

5. Detection of the inductance value $L_0$, that is, the inductance value opposite the uncoated base body.

6. Ascertainment of the corrected value $L_0^*$ in accordance with the finding of the difference $L_0^* = L_0 - L_0$.

Now the calculation steps of the so-called postmeasurement follow:

7. Ascertainment of the inductance value of the coil in air $Ll_X$.

8. Formation of the difference $L_X = Ll_X - L1$.

9. Ascertainment of the inductance value $L_X$.

10. Ascertainment of the corrected value $L_X^*$ by finding the difference: $L_X^* = L_X - L_X$.

11. Performing the standardized value calculation in accordance with the equation, using the values L and $L_x^*$ and $L_0^*$.

12. Conversion of the standardized value ascertained in step 11 into a calibration body with the aid of a calibration curve.

Figure 6:
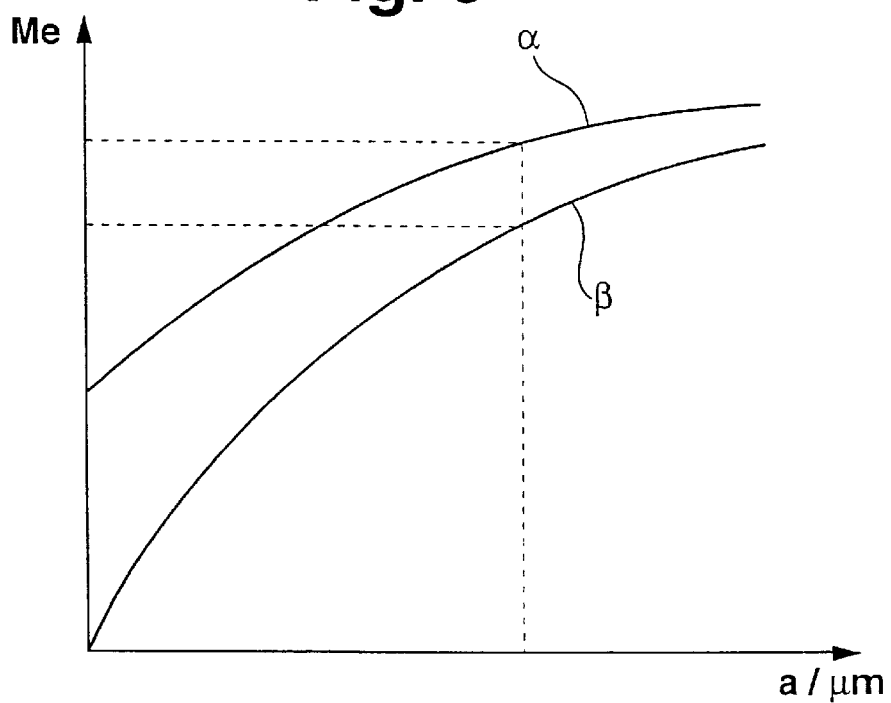
Figure 7:
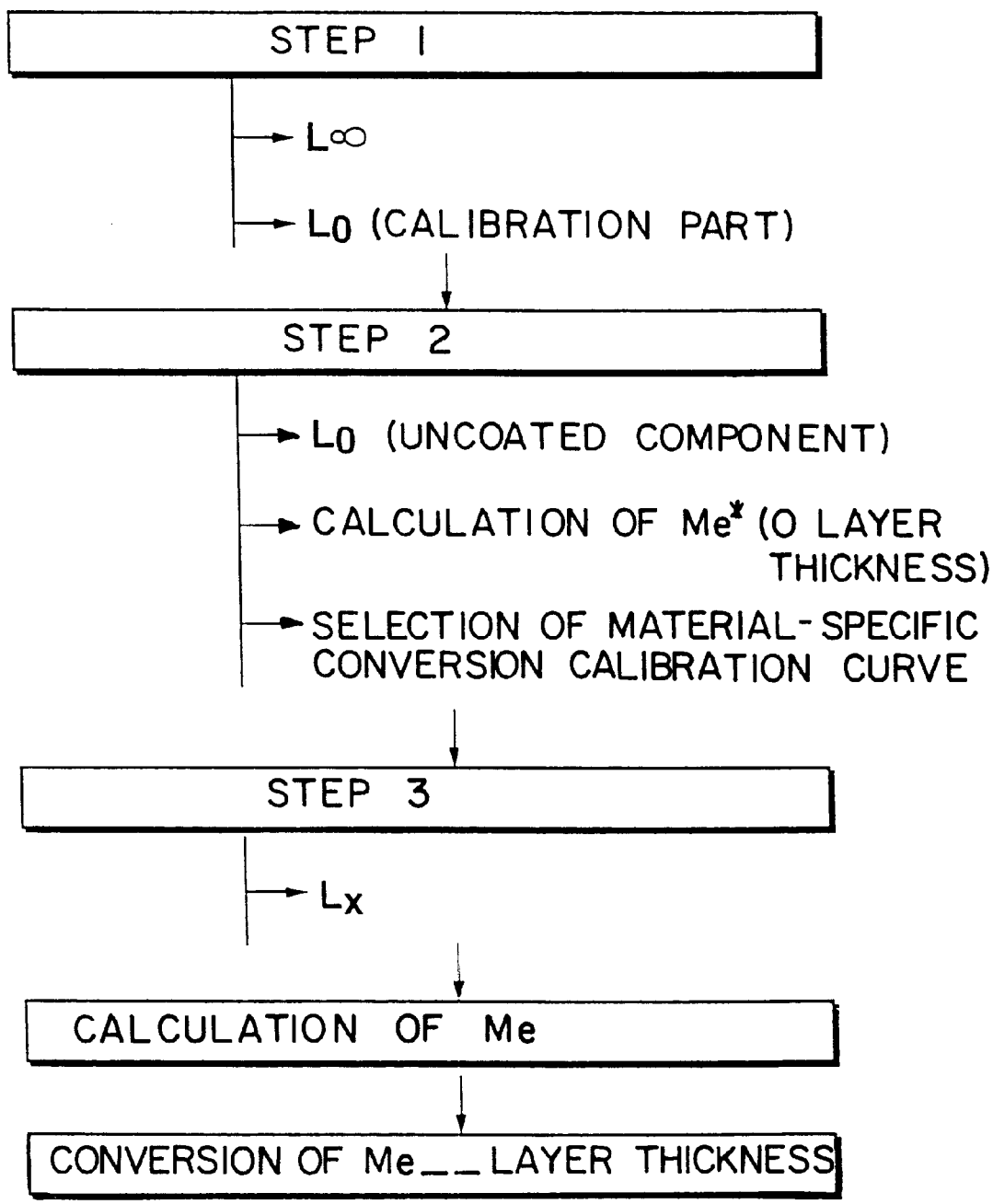
FIG. 7 shows a further block circuit diagram of a modification of the invention.

In a modification of the method, the inductance value $L_0$ is no longer ascertained individually opposite each individual component but rather is measured with the aid of a calibration element and stored in memory. However, this calibration part must not change in its electrical and magnetic properties during the operating life of the system. The inductance value L is ascertained as described -above. The measuring steps in FIG. 7 will now be described; for the sake of simplification and clarity, the correction in the temperature drift is not taken into account. For this modification of the method, it is necessary to plot a second conversion calibration curve for each material in accordance with FIG. 6; this is done using the same calibration elements as in step 1.

Step 1

1. Pickup of the inductance value L and storage in memory in a database.

2. Pickup of the inductance value $L_0$ opposite a calibration element and storage in a database.

Step 2

3. Ascertainment of the inductance value $L_0$ for an uncoated component.

4. Calculation of the standardized value Me using equation 1 for a layer thickness of zero.

5. Selection of the material-referred conversion calibration curve in accordance with FIG. 6.

Step 3

6. Ascertainment of the inductance value $L_X$ for a coated component.

7. Calculation of the standardized value with the aid of equation 1.

8. Conversion of the standardized values into layer thickness values with the aid of a selected calibration curve.

It should be noted that in this method, as compared with the eddy current method or inductive current method used in the prior art, here a high-frequency alternating current, such as 4 MHz, flows through the measuring coil. The result is lower coil inductances. No coil core is required, and this makes a variable, economical mode of design possible.

By using a so-called multiplexer, it is possible to survey many measurement parts within a short time. In this process, many measuring coils are simultaneously associated with the measuring faces to be determined. In rapid succession, these measuring faces are scanned by a measurement bridge, using the multiplexer. This can be done even if the inductance values are ascertained at the aforementioned high measuring frequency of 4 MHz, for instance.

Figure 9:
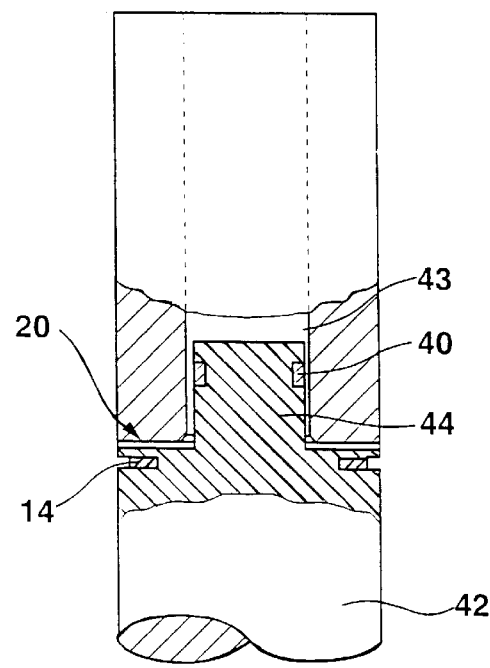
FIG. 9 shows a modification of the measuring body used in the measuring method.

FIG. 9 shows a further feature of the structural arrangement of FIG. 1. The detection, described in the method of the inductance value $L_0$ (measurement of the coil opposite the uncoated component) can also be done with a separate, second measuring coil 40. To that end, after the chromium plating or in other words the application of the layer whose thickness is to be measured has been done, an uncoated zone must still be left on the surface of the component to be monitored. In the case of the component 41 shown in FIG. 9, an extension 44 of the coil body 42 protrudes into a bore 43 of component 41. The wall of the bore 43 is not covered by the chromium layer to be determined. With the aid of the coil 40, the electrical and magnetic property of the base body-can now be ascertained, while at the same time, with the aid of the measuring coil 14, a measurement opposite the chromium layer to be determined can be made. With the aid of this sensor, it is possible for the component to have to be positioned at the sensor only once, resulting in an even shorter cycle time.

Figure 10:
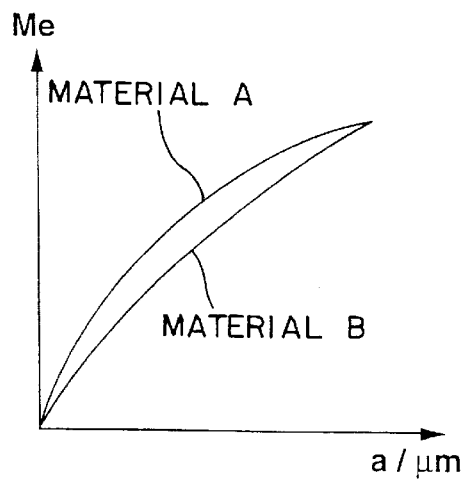
In FIG. 10, the course of the standardized values Me over the layer thickness a is plotted for basic materials of different quality.

In the measuring method described thus far, it has been assumed that the quality of the basic material fluctuates within only very narrow limits. This is particularly applicable to FIGS. 2 and 4. If in mass production, however, the basic material is furnished by different vendors, for example, then differences in quality with greater fluctuations can occur. These fluctuations can for example be due to different annealing methods of the basic material, but that means changes in the permeability of the basic material. Thus these greater fluctuations cause a change in the magnetic and electrical properties of the basic material, and as a result, different measurement signals would be produced even though the layer thicknesses were not different. With the aid of the correction method now to be described, this influence on the measurement signal of fluctuations in the material nature of the basic material is now largely eliminated. In FIG. 4, virtually coincident measurement curves for relatively slightly different basic materials has been assumed up to now. Because of the aforementioned highly different quality of the basic material, the result is different curves, shown in FIG. 10, that represent the relationship between Me and a. The staring and ending points of all the measurement curves would coincide. To eliminate error, a characteristic value K must now first be ascertained; it describes the quality of the basic material and thus provides a statement about the quality of the basic material. To that end, from the above-described premeasurement, the inductance value $L_0$ of the sensor coil is used. This value $L_0$ is then converted with the aid of an algorithm into a dimensionless characteristic value K. The magnitude of this characteristic value K determines the value of a correction factor F derived from it, with which correction factor the measured measurement signal of the thickness of the coating can be corrected. It is understood that the value $L_0$ must be ascertained for each individual object of measurement. The characteristic value K is now calculated in accordance with the following equation:

$$K = e * \frac{L_{SA} - L_0}{L_\infty^* - L_{SA}}$$

in which e is a numerical factor (such as 100) for the sake of obtaining significant characteristic variable values. Optionally, it may also be 1.

Also, $L_{SA}$ is the inductance value of the sensor coil measured in air $L_0$ is the inductance value of the sensor coil with the coil positioned at the uncoated measuring face of the basic material $L^*$ is the inductance value of the sensor coil with the coil positioned at a chromium-coated measuring face; that is, the layer thickness of chromium, for example, is much thicker than the penetration depths of the alternating field of the coil, which means that the coil is measuring only opposite the material making up the layer.

Figure 11:
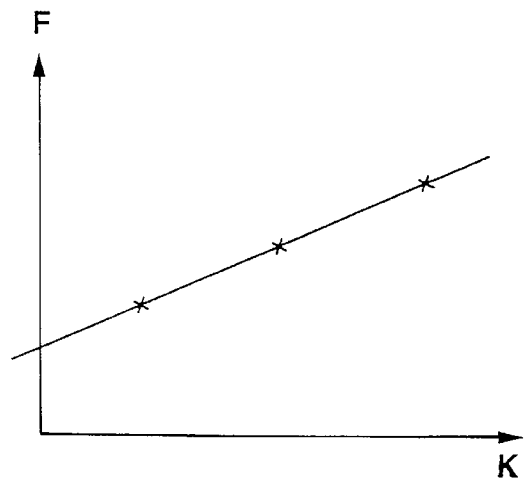
FIG. 11 also shows the course of the correction factor F over the characteristic value K that describes the quality of the fundamental material of the basic material.

In the broadest sense, largely independently of the measuring coil, this characteristic value K detects the electrical and magnetic properties of the basic material. Since these properties affect the level of the measurement signal, as can be inferred from the above description on ascertaining the measured value, the characteristic value K can be used to correct the ascertained measured value of the layer thickness. This characteristic value K must now be converted into a correction factor F for eliminating measurement error in the measured values for the layer thickness. This correction factor F is ascertained for example with the aid of the characteristic calibration curve shown in FIG. 11. In the graph of FIG. 11, a linear relationship is assumed between the correction factor F and the characteristic value K, in accordance with the equation $$F_x = b * K_x + c.$$

In this equation, b represents the slope of the characteristic calibration curve, and c represents the starting value of the curve.

This characteristic calibration curve is now ascertained such that measurement objects with different characteristic values K are equally coated, that is, with the rated layer thickness of the part to be tested. This layer thickness is first measured, by the method described above, and then verified by a different method, for example in a micrograph or polished section. By means of the equation $F = D_M/D_W$, the applicable correction factor F can be ascertained for the characteristic values K of the individual objects of measurement.

$D_W$ stands for the actual layer thickness as measured for example in the micrograph; and $D_M$ represents the layer thickness determined with the aid of the aforementioned measuring method.

The characteristic values K and correction methods F ascertained for various objects of measurements are plotted in a graph in accordance with FIG. 11. The course of the resultant curve is also dependent on the substrate material for the object being measured. The curve course can also be virtually linear. In that case, the factors b and c of the aforementioned equation $F_x = b * K_x + c$ can be ascertained, so that converting the characteristic values into correction factors can be easily accomplished. If linear conditions cannot be assumed, then the conversion of the characteristic values into correction factors must be done using values stored in table form.

The greatest correction accuracy is obtained if the aforementioned rated layer thickness is also largely equivalent to the thickness of the layer subsequently to be measured and corrected.

Once this characteristic calibration curve shown in FIG. 11 has been ascertained, a correction factor F can be assigned to each characteristic value K. Thus after that, for each ascertained layer thickness $D_M$, the real layer thickness $D_W$ can be ascertained with the aid of the correction factor F, using the equation $D_W = D_M/F$.

What is claimed is:

1. A method of eliminating measurement errors in determining a thickness of a layer of an electromagnetically conductive material applied to a body of a ferromagnetic material, with the aid of at least one measuring coil through which an alternating current flows and whose change in inductance is evaluated, the method comprising the steps of ascertaining a dimensionless characteristic value in accordance with the following equation:

$$K = e^* \frac{L_{SA} - L_0}{L_\infty - L_{SA}},$$

wherein e is a numerical factor for obtaining significant characteristic variable values, $L_0$ is an inductance value of an uncoated base body of the coil, $L_{SA}$ is an inductance value of a sensor coil measured in air, $L_\infty$ is an inductance value of a sensor coil with a coil positioned at a chromium-coated measuring face;

converting the characteristic value K with the aid of a characteristic calibration curve into a correction factor F; and converting a measured thickness value $D_m$ into a real thickness value $D_w$ with the aid of the following equation:

$$D_W = \frac{D_M}{F},$$

wherein $D_M$ is the measured thickness value:

F is the correction factor.

2. A method as defined in claim 1; and further comprising using the characteristic calibration curve which has a substantially linear course.

* * * * *